United States Patent
Allen et al.

(10) Patent No.: US 6,877,114 B2
(45) Date of Patent: Apr. 5, 2005

(54) ON-CHIP INSTRUMENTATION

(75) Inventors: W. James Allen, Carmel, IN (US); Bernard M. McFarland, Warren, IN (US); Terry L. Fruehling, Kokomo, IN (US); Kevin M. Gertiser, Noblesville, IN (US); Roy M. Fildes, Westfield, IN (US); Bruce C. Young, Rossville, IN (US); Mark T. Lowden, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 497 days.

(21) Appl. No.: 10/075,319

(22) Filed: Feb. 14, 2002

(65) Prior Publication Data

US 2003/0154430 A1 Aug. 14, 2003

(51) Int. Cl.[7] .............................................. G06F 11/00
(52) U.S. Cl. .......................... 714/45; 714/30; 701/29; 701/31
(58) Field of Search .............................. 714/45, 30, 33, 714/50, 39; 701/29, 31, 35

(56) References Cited

U.S. PATENT DOCUMENTS

| | | | | |
|---|---|---|---|---|
| 6,397,354 B1 | * | 5/2002 | Ertekin | 714/34 |
| 6,615,370 B1 | * | 9/2003 | Edwards et al. | 714/45 |
| 6,618,775 B1 | * | 9/2003 | Davis | 710/100 |
| 6,662,313 B1 | * | 12/2003 | Swanson et al. | 714/39 |
| 6,687,811 B1 | * | 2/2004 | Yamada | 712/227 |
| 6,760,864 B2 | * | 7/2004 | Wood et al. | 714/30 |
| 2002/0116093 A1 | * | 8/2002 | Aldrich et al. | 701/1 |
| 2002/0143455 A1 | * | 10/2002 | Bidner et al. | 701/69 |

OTHER PUBLICATIONS

McDaniels, George, IBM Dictionary of Computing, 1994, McGraw–Hill, Inc., Tenth Edition, p. 488.*

* cited by examiner

Primary Examiner—Robert Beausoliel
Assistant Examiner—Marc M Duncan
(74) Attorney, Agent, or Firm—Stefan V. Chmielewski

(57) ABSTRACT

An electronic control unit (ECU) includes a central processing unit (CPU), a non-volatile memory bank, a volatile memory bank and a state machine. The state machine is in communication with the CPU and functions to selectively capture information available on an internal bus of the CPU on a cycle-by-cycle basis and store the captured information in the volatile memory, which is also coupled to the CPU.

38 Claims, 7 Drawing Sheets

ON-CHIP INSTRUMENTATION

TECHNICAL FIELD

The present invention is generally directed to an electronic control unit (ECU) and, more specifically, capturing information present on internal buses of a microcontroller unit (MCU) including when distinct central processing unit (CPU) and peripheral buses are implemented in the ECU.

BACKGROUND OF THE INVENTION

In automotive electronic control units (ECUs), higher performance requirements have led to the use of higher-end central processing units (CPUs), which are typically part of embedded microcontroller units (MCUs) that include on-chip instruction and data caches, high-speed random access memory (RAM) and flash read-only memory (ROM). As various automotive subsystem designers have migrated to higher-end CPUs, it has become increasingly difficult to provide visibility for logic analyzer, processor emulation and calibration without compromising performance of a given ECU. For example, in MCUs implemented with an internal bus for core operations and an external peripheral bus for I/O operations, the internal bus cannot typically be coupled to external pins, thus, preventing sufficient visibility to perform complete logic analysis.

In general, system developers require development tools to perform logic analysis, run control, and calibration. As is well known, logic analysis typically pertains to accessing program trace information to correlate program flow of the ECU to real-world interactions. In general, the developer also needs to perform logic analysis to retrieve information on how data flows through the ECU and to understand what system resources are creating and accessing the data. Finally, logic analysis is directed to determining whether the software of the ECU is meeting the required performance standard with acceptable impact to the ECU under test. For run control, a developer normally needs to be able to query and modify all registers and memory locations in the ECU and needs support for breakpoint features provided by debug interfaces, as either hardware or software breakpoints depending upon the architecture of the CPU.

Traditionally, software development of ECUs has been supported through direct access to CPU buses, via bus lines that could be multiplexed with an I/O port of an MCU. However, with CPUs that implement a two bus system (internal/external) there is generally less or no external bus visibility of internal data or instruction flow and/or a reduction in performance of the MCU if flow information is shown in real-time on an external bus, such as the use of a background debug port.

The requirement for higher performance automotive ECUs has prompted many designers to move from microprocessor based systems, where the CPU buses are exposed and available for instrumenting, to microcontroller based systems, where the CPU buses are internal and are not available for instrumenting without significant cost and pin count penalties. In addition, many of the microcontroller parts have wider buses, e.g., 32 to 64 bits, which amplify the above-mentioned penalties. Increasingly, designers have been challenged with providing visibility needed for calibration, logic analysis and processor emulation while keeping costs contained and not compromising performance of MCUs with higher-end CPUs.

When multiple bus embedded MCU systems are employed, it is even more difficult for external tools (i.e., logic analyzers or in-circuit emulators (ICEs)) to determine the actual instruction being executed as there is no external or off-chip visibility of the program address bus. As higher-end microprocessors are run at higher frequencies, a typical ICE cannot implement memory emulation and real-time diagnostics as the available timing budget is simply too short to facilitate these functions. In addition, deep instruction pipelines, on-chip caches and RISC speculative architectures generally make it difficult to determine what instructions were fetched and which were actually executed.

In general, breakpoints allow a program to be stopped at a specified event, which can be specified as a c(ode execution at a specified address or as a data access (i.e., a read or write) to a specified address with a specified value (e.g., when 0FFF(h) is written to address 09876543). Watchpoints, which are similar to breakpoints, provide a message to a debug tool when a watchpoint occurs, as opposed to halting the CPU of the MCU.

Recently, to address some of these concerns, a number of manufacturers have joined together to create a standard debug interface for embedded control applications known as NEXUS™ (previously known as the global embedded processor debug interface standard (GEPDIS)). The NEXUS™ debug interface can be used to connect tools to an embedded system to facilitate run-time control (i.e., debugging), code execution trace capture and data access capture, calibration (data access on-the-fly), logic analysis and rapid algorithm development.

The NEXUS™ interface uses a branch trace capture and instruction cycle counting technique to compress the information needed to reconvolve the actual trace of the program execution. In this manner, the executed code's address information is provided via the debug module's communication port at branch or exception instructions only and the external debug tool interpolates or reconvolves the program trace for sequential (i.e., non-branch) instructions from a local image of the code memory contents. Although this increases cost and complexity to the external instrumentation tool it does allow the debug/instrumentation tool to perform reconstruction of the program flow. In general, the NEXUS™ interface provides a limited capability for the debug tool to track real-time data accesses to various memory locations. The trace can be restricted by specifying a specific range and a specific access type (i.e., read or write), however, this data is not directly correlated to the instruction flow.

As such, current debug ports only provide limited visibility into the operation of an MCU. Thus, it would be desirable to provide a technique for capturing information on the operation of an MCU that is cycle-by-cycle accurate.

SUMMARY OF THE INVENTION

The present invention is directed to an electronic control unit (ECU) that includes a central processing unit (CPU), a non-volatile memory bank, a volatile memory bank and a state machine. The CPU is coupled to a port, which couples the CPU to an external tool, and executes a control algorithm that controls a subsystem coupled to the ECU. The non-volatile memory bank is coupled to the CPU and stores a plurality of calibration tables and a code set. The state machine is in communication with the CPU and functions to selectively capture information available on an internal bus of the CPU on a cycle-by-cycle basis and store the captured information in the volatile memory, which is also coupled to the CPU.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1A:
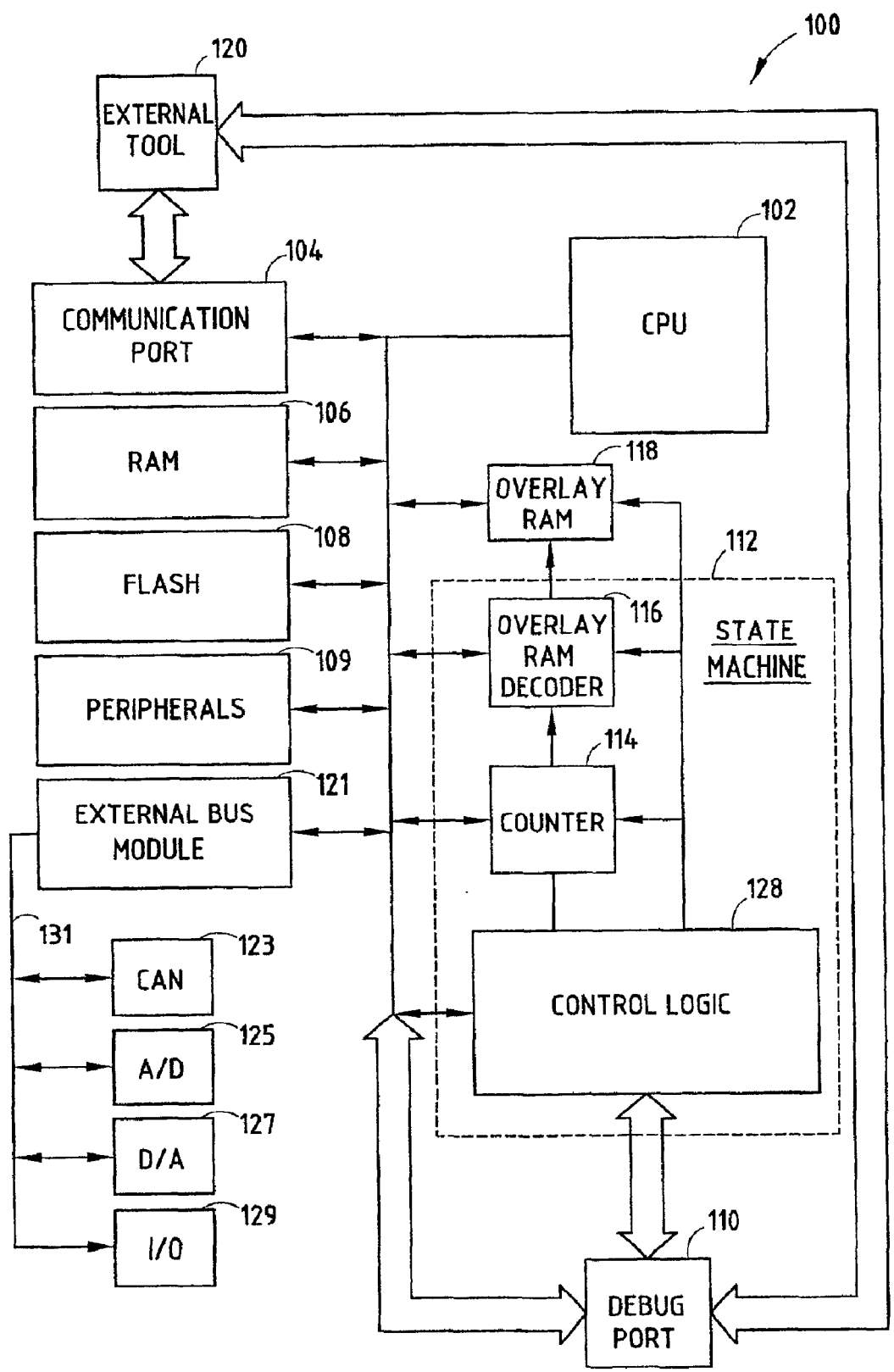
FIG. 1A is an electrical block diagram of a microcontroller (MCU), according to one embodiment of the present invention.

The discussion of the present invention is directed to an electronic control unit (ECU) that includes a central processing unit (CPU) that is typically embedded in a microcontroller unit (MCU). While the invention is described from the perspective of Von Neumann unified bus architectures, it should be appreciated that the invention is directly applicable to multiple bus Von Neumann and Harvard architectures employing separate instruction and data buses.

The present invention includes a CPU that is coupled to a communication port, which couples the CPU to an external tool. The CPU executes a control algorithm, which controls a subsystem coupled to the CPU, and is coupled to a non-volatile memory that may store a code set and a plurality of calibration tables. A state machine is in communication with the CPU and functions to selectively capture instruction and data information, or a portion thereof, available on an internal bus of the CPU on a cycle-by-cycle basis and store the captured information in a volatile memory that is also coupled to the CPU. The volatile memory can be random access memory (RAM) that is either dedicated to the state machine or redeployed calibration RAM that the state-machine can access.

A basic function of the present invention is to capture cycle-by-cycle accurate information from a CPU bus in a wide variety of computing platforms. More broadly, the present invention addresses issues related to deterministic program execution. As used herein, a MCU can be described loosely as microprocessor, if one thinks of the CPU as it is linked to key support modules. These support modules aid the CPU in fetching, loading, decoding and executing instructions. These general support modules makeup the microprocessor system, or simply stated a microprocessor, which then finds its application as part of a general computing platform.

When additional support modules, which are customized to directly support a particular application, are added to the microprocessor, the microprocessor becomes an application specific MCU. Examples of the on-chip up-integration of customized modules may include, but are not limited to, system modules that accommodate input capture/output compare, timing and waveform generation processing, analog-to-digital conversion or specialized interface modules, which speed up the ability of the CPU to gather and respond to external data.

The microprocessor, and all of its complex variations, then becomes part of a general computing platform realm, which is commonly found in personal computers (PCs) or complex workstations and network servers. In a similar fashion, the MCU is employed in more specific applications, generally directed at control systems, and becomes part of a specialized computing platform known as an electronic control unit (ECU).

An MCU dedicated to the control of one vehicle subsystem, such as an anti-lock brake system (ABS), is considered to be embedded in that subsystem. Further, when the MCU is part of an application specific ECU (such as an ABS ECU) that contains additional interface circuits supporting specialized input/output (I/O) requirements, the combination can be referred to as an embedded controller.

These distinctions are made to provide classification examples of the very broad generalized computing platform realm and the embedded controller computing platform realm. The present invention provides direct advantages to both computing platform realms or any assortment of hybrid computing platform classifications. For simplicity of discussion, the discussion herein is directed to an application specific MCU embedded controller computing platform. Upon reading the disclosure herein, one of ordinary skill in the art will appreciate that the disclosed concepts can be directly applied to general computing platforms.

As described herein, ECUs designed according to the present invention can reduce production cycle times as well as provide accurate cycle-by-cycle trace information of a CPU functioning within the ECU. Production cycle times are generally reduced as intermediate product development cycle steps (which incorporate significant instrumentation hardware on prototype units) can be substantially eliminated.

Traditionally, instrumentation hardware, which is specific to the needs of prototype product development and design cycle (such as hardware and software design and validation), has been stripped from the product system in "first run" or "pilot" production units. However, removing instrumentation hardware can modify the behavior of the end product. Thus, by incorporating the instrumentation on chip, the system becomes part of the end product and discrepancies between the development units and the production units are essentially eliminated.

The present invention not only circumvents the current limitations of the "branch trace" NEXUS™ (or similar) instrumentation strategy, but also incorporates innovative system architectures directly to the bus of the microprocessor or MCU systems without modifying their basic design. The architecture of the present invention allows the prototype product to run at full speed and reduces the intrusiveness of hardware typically added to a computing platform for development purposes.

Since the on chip instrumentation (OCI) hardware added to the chip is permanent, external hardware (previously mentioned) is no longer required. This enables a prototype to look like a production unit, earlier in the design cycle. Hence the present invention reduces development costs and, unlike the varied NEXUS™ instrumentation derivatives, gives a cycle-by-cycle accurate picture of what the CPU is actually executing and the data that is being processed.

The system can reuse an existing I/O communication port, or debug port for data communication, thus, avoiding expensive pin count penalties required by different levels of NEXUS™ (which can employ as many as eight I/O pins) or previous debug design remedies (that required bus expansion and I/O port reconstruction units). Further, the pins that were used for NEXUS™ (or other less effective remedies) can be readily redeployed for the intended application. Additionally, because the present invention is an integral part of the microprocessor or MCU system, it is always available to the developers. As such, data can be acquired from the system both during the development of a product and once that product has gone into production.

As mentioned above, past CPUs had exposable address and data buses, thus, permitting developers to monitor the activity on the CPU buses. However, this required added hardware for external MCU bus expansion and I/O port reconstruction units. As modified, these systems were frequently not capable of full speed operation and were generally not adequate for production units, to satisfy all forms of product validation. Further, as clock frequencies increased and peripherals were up-integrated, the CPU buses were isolated from the peripheral bus and buried in the chip, i.e., no longer brought out on external pins.

As mentioned above, this CPU bus architecture led to the development of debug ports in which most implementations of the instrumentation design effort (such as NEXUS™ Level 1, 2, 3 and 4) provided visibility that was generally inferior to the cycle-by-cycle data previously available to the developer. Thus, acquiring real-time cycle-by-cycle instruction and synchronous data information on newer multi-bus MCU systems has proven to be difficult and expensive. Further, exposing the internal CPU bus of newer designs has yielded mechanical and electronic hardware designs that cannot generally tolerate the temperature and vibrational requirements intended for the ECUs. Among others, these prior solutions have included piggy-backed and external CPU systems or I/O port expansion designs, which are generally delicate and require special handling.

The use of NEXUS™ (or similar) debug ports, though the information is incomplete, has become the main tool option available for general purpose daily debugging at a reasonable cost. Ironically, as MCU systems have become more complex, developers have generally had to rely on less information to evaluate the ultimate performance of development MCUs, which may still have subtle but significant defects.

Utilizing the present invention, a developer has better visibility into a CPU than in prior systems where CPU buses were exposed. As mentioned above, the present invention is applicable to any CPU bus structure (Von Neumann, Harvard, or variations on these) with minor implementation detail changes. For example, a past solution for gaining visibility into the MCU is branch trace messaging. In this solution, the system sends out a message to an external tool each time the software takes a branch. This message contains the address that was branched to and the number of clock cycles since the last branch. The external tool then uses this information to reconvolve software flow. The ability to accurately recreate the program flow adds greatly to the unnecessary complexity of the external tool.

In branch trace-messaging systems there is typically no way to determine if an opcode has been corrupted. An "add" instruction may have been corrupted by bus noise and read by the CPU as a "subtract" instruction. It should be appreciated that this would have a vastly different effect on the system, but would generally not be detected by branch trace-messaging. Further, such systems do not synchronize the instruction flow to the data that the MCU acted upon. However, as set forth above, such information is desirable for debugging new products in development, MCUs that have been launched as new products or MCUs still in developmental stages.

These kinds of problems are very common when new microprocessors are being developed or when a new process is used to manufacture an existing microprocessor. It should be appreciated that capturing cycle-by-cycle accurate CPU core information (synchronizing instruction and data information) and storing it within the MCU is generally superior to techniques that only capture a branch address and the number of cycles since the last branch occurred.

As used herein, the term "trace" refers to the data that is captured sequentially in time. For example, a trace could be every piece of data that appeared on a CPU bus, each stored in the order that they occurred. The user can also specify a filter to limit what items are captured in the trace buffer. Again the data is captured in the order that it occurred, however, because the filters are active a subset of the data on the CPU data bus is captured. If the user limits the data being captured to variables that are located in RAM the trace may be referred to as a data acquisition trace or data acquisition process.

As used herein, the term "state machine" is a machine that may be implemented using various levels of technology, which include discrete logic, programmable logic arrays or a secondary processor and simple glue logic. In general, the developer or application software is capable of programming the state machine to control the process of acquiring data.

As used herein the term "trace buffer address counter" is a counter that provides the trace buffer with an address during all modes of operation. If, for example, the overlay RAM is to function as the trace buffer, the state machine switches the overlay RAM from receiving its address from the CPU to receiving some or all of its address from the trace buffer address counter. All implementations (unless specified otherwise) of the present invention utilize a trace buffer to retain the data of interest to the developer. The trace buffer can be implemented as a dedicated memory or by reusing an already existing memory, such as an overlay RAM. Overlay RAMs are incorporated in many microprocessors for the purpose of calibrating the MCU and, according to the present invention, are preferably reused to store traces. It should be appreciated that when data is not being captured, the memory that is used for the trace buffer is available to the system for its original purpose.

In some modes of operation the trace buffer may be divided into two blocks. For example, in some modes one bank is used to log the address information from the CPU bus and the other bank is used to log the data from the CPU bus. As another example, one bank may be used to log a fresh/stale flag and the other bank to log the data from the CPU bus. When implemented, the fresh/stale flag is used as an indicator to the debug processing tool that a particular location has been recently accessed. It should be noted that if the trace buffer is fast enough, the trace buffer can capture both the address and data portion of the cycle without having to be broken into banks. If the RAM for the trace buffer supports additional bits outside the data field, such as tag or parity bits, these additional bits can be used for storing the fresh/stale flag so that the RAM doesn't have to be broken into banks. This implementation may be preferred, as breaking the RAM into banks effectively halves the logging capabilities of the system.

In general, all implementations of the present invention include a communication interface through which information can be passed between an external tool and the state machine, which is generally implemented within the MCU. The communication interface can be shared with other applications seeking to exchange information with the MCU, since neither the configuration of the state machine of the MCU nor the retrieving of data captured on the MCU need occur in real-time.

It is contemplated that a developer, via an external tool, can configure the MCU before the test begins with whatever bandwidth is available on the communication interface. The communication interface could be implemented using any standard interface used for communication, including, but not limited to a normal serial interface (CAN, Class II, RS232, etc.) or a software-debugging interface (BDM, NEXUS™, OCDS, etc.). In general, the present invention has six modes of operation. These modes are generally broad and categorical, due to the ability to produce hybrids or subcategories of each. For the sake of discussion, the six modes, which are described below, are as follows:

1. Full trace
2. Limited Trace
3. Range data acquisition
4. Parameter List Data Acquisition
5. Packetized Data Acquisition
6. Active point Data Acquisition In general, all six modes of operation utilize a trace buffer address counter, a trace buffer, a communication port and a state machine.

As is shown in the FIG. 1A, the serial interface is depicted as communication port 104 and the software debug interface is depicted as debug port 110. After configuration, MCU 100 runs autonomously capturing the requested data. Communication through the debug port 110 may be directly interfaced to CPU 102 bus or may occur via state machine 112. An advantage of utilizing the debug port 110 to communicate with the external tool 120 is that it may reduce the intrusiveness of programming the state machine 112 and the transmittal of information between the state machine 112 and the external tool 120. When the debug port 110 is directly communicating with the CPU 102, memory accesses by the debug port 110 are generally interlaced with the CPU 102 operation.

It should be noted that having both a debug port and a communication port has utility but is not required. It should be further appreciated that communicating with the system through the communications port 104 controlled by CPU 102 only limits the rate at which configuration information can be downloaded or which data can be uploaded from the MCU 100 to the external tool 120. When the debug port 110 communicates directly with the state machine 112, the debug port 110 is not required to arbitrate access to the CPU 102 bus to configure or upload data from the MCU 100. This solution generally provides a developer with maximum speed and typically the least intrusiveness into the CPU 102 operation.

In certain situations, it may be advantageous for a developer to communicate via the communication port 104, rather than debug port 110. This enables the developer, with this invocation, direct access to significant instrumentation capabilities without special instrumentation software tools (i.e., software needed to communicate through the debug port 110). As such, when a developer utilizes tools that can communicate via CAN or another serial protocol, additional debug port tools are not required to communicate with the CPU 102. In general, this has significant benefits to automotive and, most likely, other markets in that every production vehicle in the field now has dedicated instrumentation capability for the life of the vehicle, without having to load special software. As such, latent or peculiar field failures can be evaluated with the embedded controller located in the exact environment in which the anomaly is occurring.

As discussed above, as system complexity increases it is desirable to develop embedded MCUs with increased diagnostic capabilities. Leveraging this form of on chip instrumentation, prototype development and pilot units can begin to look like production units. This may generally reduce product development cycle times for a broad variety of applications. Further, ECU developers have attempted to reduce the size of required instrumentation and the test connector through which the instrumentation interfaces to the ECU for a considerable period. As previously mentioned, in pursuing this course, the industry has begun to increase the capability of various debug ports so that they can be used for internal CPU bus visibility, required to perform system debugging. However, as previously mentioned, commercially available debug ports only provide limited visibility into the operation of a CPU, especially those implemented with a multiple bus system. According to the present invention, a technique is described herein that allows for the capturing of information on the operation of the ECU that is cycle-by-cycle accurate.

In one embodiment, an existing overlay RAM of the MCU is utilized for the storage of cycle-by-cycle accurate trace logic analysis (i.e., full trace mode, synchronized address, data and instructions) or data acquisition (i.e., something less than full trace mode) information from the CPU of the MCU. While the discussion herein is primarily directed to automotive subsystems, it should be understood that the disclosed techniques have broad application to other embedded controller applications, e.g., data communications, computer peripherals, wireless systems, and medical or aerospace embedded system electronics.

The embodiments disclosed herein focus on MCU system enhancements to accumulate and retrieve diagnostic information, while the MCU is executing application code. As discussed above, an MCU is generally a CPU surrounded by system peripherals, connected by a variety of bus architectures. These concepts can readily be adapted to microprocessor systems that run in an expanded mode, such that all of the peripherals can be identified as separate subsystem components. This may be the case in very flexible computer systems. While such systems may not generally be considered to be embedded systems, they can be redefined to meet a host of applications depending on the need. Hence, the concepts described in this invention can be extrapolated easily to any non-embedded or embedded computing platform also broadly known as electronic control units (ECUs).

Referring again to FIG. 1A, an external tool (e.g., a personal computer (PC)) 120 communicates with the MCU 100 through either the communication port 104 or may communicate through a debug port 110 (in MCUs that have debug ports). According to the present invention, full internal visibility can be achieved through the addition of a state machine 112, which may include a counter 114 and an overlay RAM decoder 116. The counter 114 and the overlay RAM decoder 116 may also be implemented external to the state machine 112.

In the embodiment of FIG. 1A, the state machine 112 configures the overlay RAM 118 to be used as a trace buffer (i.e., for full trace mode) or a data acquisition buffer (i.e., for data stream accumulation, which is a subset of a typical full trace mode), depending upon the function selected by a developer, via the external tool 120. When the overlay RAM 118 is configured as a trace buffer, the information is captured by the overlay RAM 118 each time any information is present on an instruction/data bus. Since the CPU 102 retrieves both instructions and data on the same bus, it is relatively straight forward for the overlay RAM 118 to capture a trace (in systems employing multiple execution units/CPUs, multiple trace units are generally required). As shown, the overlay RAM 118 receives its address from the counter 114 instead of the CPU 102 when the trace operation is in progress. In full trace mode, the counter 114 is incremented with each clock cycle that contains an instruction or data. As is also shown in FIG. 1A, an external bus module 121 is coupled to the CPU 102 bus and provides an interface for various peripherals, such as CAN interface 123, an A/D converter 125, a D/A converter 127 and an I/O port 129, which are coupled to the module 121 via a bus 131. Additionally, a number of other peripherals 109 may be coupled to the CPU 102 bus.

Figure 1B:
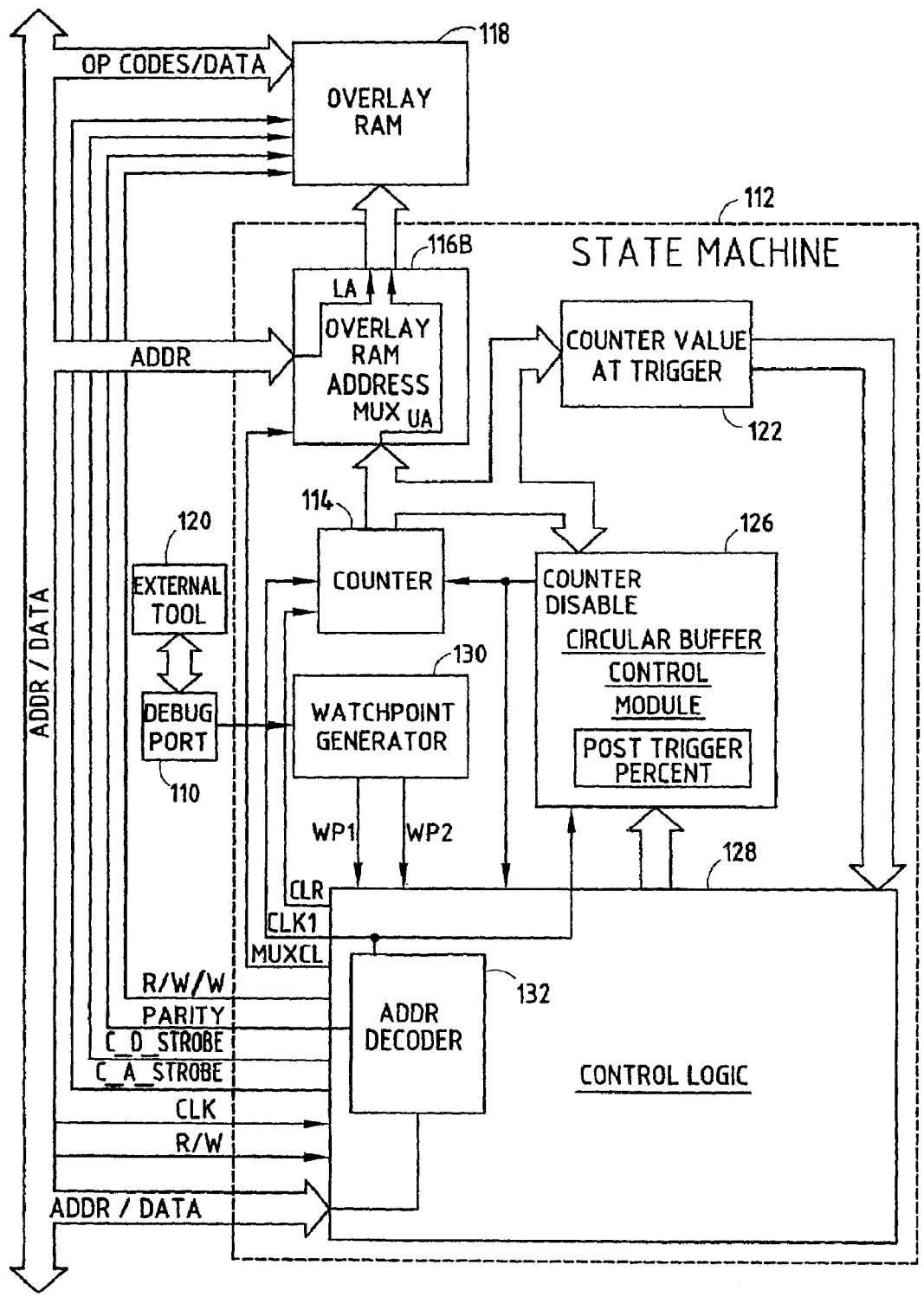
FIG. 1B is an electrical block diagram of an MCU, according to another embodiment of the present invention.
Figure 1C:
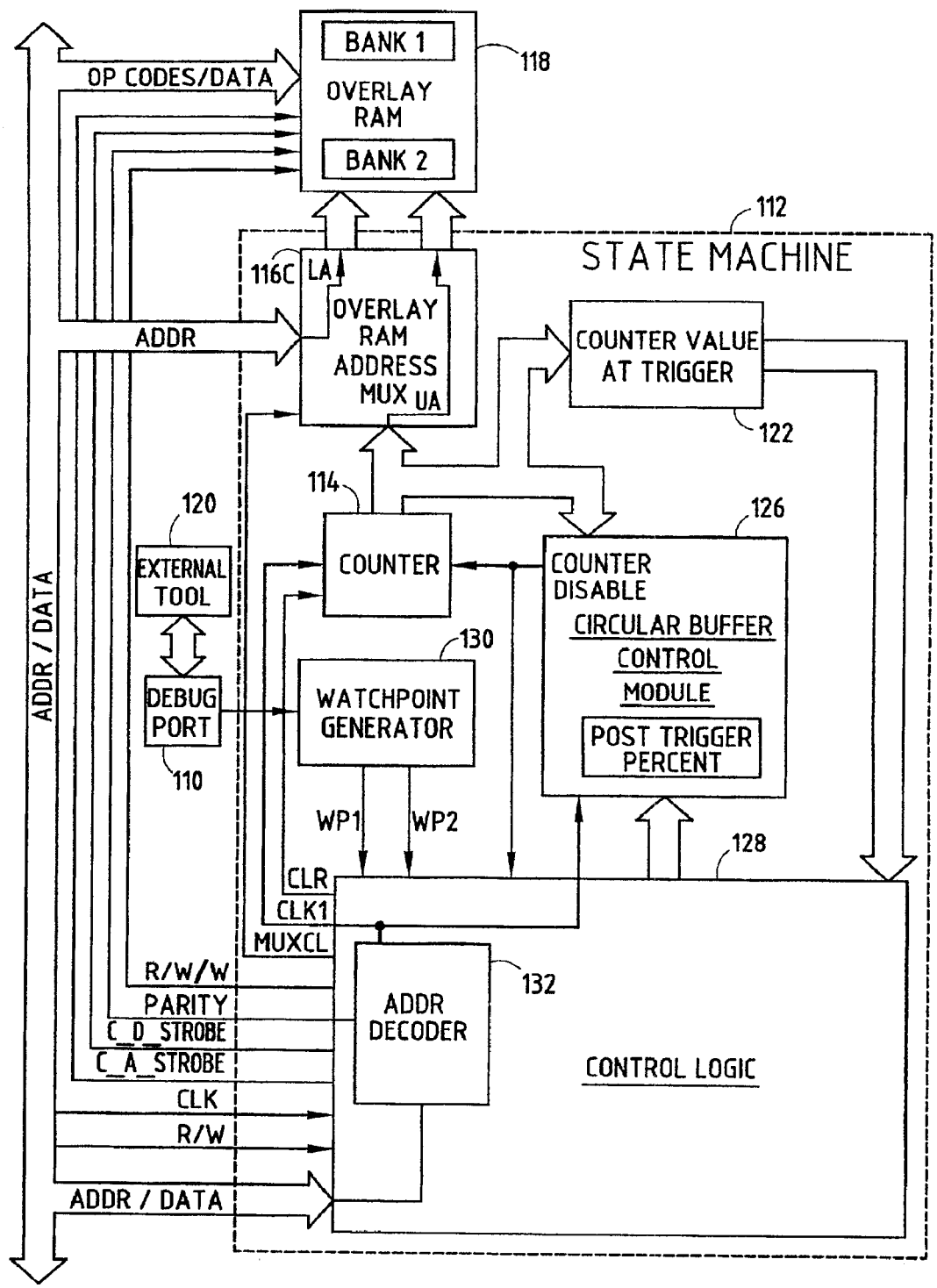
FIG. 1C is an electrical block diagram of an MCU, according to yet another embodiment of the present invention.

In the embodiment shown in FIG. 1B (for limited trace) only the opcode and application data is captured in overlay RAM 118. As such, after the trace data is transferred to an external tool 120, the program flow is reconstructed by post processing on the external tool 120. In the embodiment of FIG. 1C, the overlay RAM is divided into two banks: one for the address portion of the cycle and one for the opcode/operand or data portion of the cycle. In this embodiment, both banks of the overlay RAM 118 have address information provided by the counter 114. The state machine 112 handles the triggering and buffer control of the circular buffer, implemented within the overlay RAM 118. When the overlay RAM 118 is, for example, full, the information stored in the overlay RAM 118 can be downloaded to the external tool 120.

In the data acquisition mode, data is acquired in basically the same manner as in full trace mode, except that the data to be captured is a subset of the information that is available on the buses of the CPU 102. In this case, the source address for each data point is captured so that the captured data or information can then be associated with a specific variable. This is due to the fact that the data may not be accessed in a predicable order. Using this source address the captured data can then be reassociated with the source code using a program executing on an external tool 120. As used herein the term "data" may refer to instruction data, application data. information and calibration values.

When an address generated, via the CPU 102, indicates that it is not within a desired range, the data stored in the overlay RAM 118 is overwritten at a next data cycle. As previously mentioned, a developer using an external tool (or application software) can provide an address or a range of addresses such that the counter 114 only increments if the information latched into the overlay RAM 118 is within a preset range.

As is shown in FIG. 1C, the state machine 112 provides an overlay RAM address mux 116C that can switch the overlay RAM 118 from receiving its address from the CPU 102 to receiving it from the counter 114. The control logic module 128 does this by asserting the multiplexer control (MUXCL) signal at the appropriate time in the data acquisition process. The control logic module 128 is also coupled to the address, data and various control lines of the CPU 102 bus. The control logic module 128 receives a clock signal and read/write (R/W) signal from the CPU 102 bus. In response to the address on the bus of the CPU 102, the control logic module 128 provides a data strobe signal for the data portion of the bus cycle (C_D_Strobe) and a data strobe signal for the address portion of the bus cycle (C_A_Strobe) to the overlay RAM 118. The control logic module 128 also provides a read/write/write (R/W/W) signal to the overlay RAM 118. The R/W/W signal is a version of the R/W signal in which all reads and writes on the data bus have been converted to writes with the appropriate timing such that the overlay or dedicated instrumentation overlay RAM 118 can capture the instruction and application data. The control logic module 128 also provides a clock signal (CLK1) and a clear signal (CLR) to the counter 114.

In use, the developer programs the state machine 112 with all the information needed to perform the particular trace operation required. As previously mentioned, this can be accomplished through the external tool 120, through either the debug port 110 or the communication port 104. While in any of the modes, qualifying parameters such as watchpoint information, post trigger percent and address ranges may all be adjusted.

According to one embodiment of the present invention, an MCU that implements on-chip instrumentation is capable of capturing information in all six of the above-listed modes. In the full trace mode, the address and corresponding instruction or data is logged. In the limited trace mode, only instructions and data are captured with the addresses for the instructions and data being reconvolved by an external tool at a later time. In the range data acquisition mode, magnitude comparators are used on various parameters to control what data is being logged. In the packetized data acquisition mode, snapshots of data are logged when specific events occur in the system. In the parameter list data acquisition mode, only variables that are defined in a user-defined list are logged by the system. It should be noted that this refinement could be used in conjunction with the other data acquisition modes. In the active point data acquisition mode, the system logs what address was last accessed in a user specified range.

In the full trace mode, both the address and whatever else is on the instruction and data bus is captured on a cycle-by-cycle basis. In this manner, both the address that the instruction came from and the instruction itself are captured. In contrast, in the limited trace mode, only the opcode portion on the instruction bus and the data portion on the data bus are captured. When the MCU has implemented the limited trace mode and the data is uploaded to an external tool, the external tool is programmed to evaluate the uploaded data to determine what code was ran and the addresses are then reconvolved by a program running on the external tool. For example, the external tool may determine that a read, store, store, read, multiply and subtract occurred. Using a reference address (i.e., the counter 114 value), the external tool may then determine, for example, that the code was at address 2000(H) when it started and the next opcode would indicate that a branch was taken and the data it read would correspond to a second opcode.

It should be noted, in the limited trace mode there are certain situations where the external tool may have to flag certain sections of the data trace that cannot be correlated to the code the CPU was running. User intervention may then be required to resolve these cases. In contrast, in the full trace mode, since full information is provided to the external tool, the external tool knows exactly what instruction was executed. As such, the external tool does not have to reconvolve any address information.

In the range data acquisition mode, internal magnitude comparators of the state machine are used to set a range in which it is desired to capture data. In this way the trace buffer becomes filled with a sequence of the data items that are recorded in the order that they occurred on the CPU bus.

The packetized data acquisition mode logs every bus cycle that falls in an appropriate range into a section of the trace buffer. Each section that is recorded in the trace buffer is considered one packet. In this manner, all reads and writes to that address ranges are saved in a packet. However, the packet is not incremented until the CPU hits a trigger point. When a trigger point is received, another packet is logged into a new section of the trace buffer. In this manner, the trace buffer looks like a series of snap shots of memory, which allows the developer to compress the information that is desired. This allows a developer to log data for very long periods of time with a reasonably small buffer and yet be able to recreate points of interest. For example, if a developer suspected that a left wheel speed sensor on a vehicle was defective, the developer could use the system to only capture the reading from the left wheel speed sensor. Because packetized data acquisition is used, the developer does not have to review every access but can monitor the access at a specific time interval, e.g., every 20 minutes.

The parameter list data acquisition mode is basically a refinement of the range data acquisition mode. The parameter list data acquisition mode allows the developer to trigger on a given list of parameters. For example, if the developer suspects that the wheel sensors are glitching, the developer would set the state machine up such that it only captures data when the address for one of the wheel speed sensors was on the CPU bus. A trigger event would be defined so as to indicate when the point of interest has occurred. For example, the trigger event may occur when the output of the right rear wheel speed sensor indicated a value above a predetermined value, e.g., 200 kph. After the trigger, the logging process continues until the buffer is full. Once full, the buffer can be saved until an external tool uploads the data. In this manner, the buffer contains right rear wheel speed sensor data before, during and after the trigger.

The active point data acquisition mode allows the developer to use sets of magnitude comparators, programmed via the external tool, to log the last active point in, for example, the calibration table by logging the last address accessed in the address range of the calibration table. This mode differs from other modes in that the address of the accessed location is logged, not the data from that location. Using this data, a developer can determine whether the CPU is executing code from the correct portion of memory or not moving out of a certain portion of memory. For example, using this mechanism, the start address and the end address, for a subroutine can be placed in an active point mechanism such that the developer can determine what address was reached before the range was left. In this manner, system performance analysis can be utilized to determine whether a specific routine ever finished or at least how far in a specific routine the program went or whether the routine was ever accessed.

Using this feature, the developer can also determine stack depth, and stack over-run/under-run conditions. This feature can also be used to catch an illegal access (for example, when a programmer used a wrong pointer index) by setting the active point to a range that is outside of FLASH or RAM memory. In one implementation, the active point data is stored in the trace buffer. However, in some cases it may be desirable for the active point data to have dedicated registers. As mentioned above, this feature can also be utilized to pinpoint abnormalities within the CPU itself.

The external tool may initialize the state machine 112, as needed. For example, when the state machine is configured for full trace mode, the overlay ram address mux 116C provides an address to both banks of overlay RAM 118. This address is sourced by the counter 114 and is incremented and controlled by the control logic module 128.

The control logic module 128 increments this address each time a valid address (per the qualifying parameters) is presented on the CPU bus. The control logic module 128 also provides the appropriate signals to capture the desired data from the CPU bus. In this embodiment the control logic data strobe (C_D_Strobe) is used to capture the data/opcode portion of the cycle. In a like manner, the control logic address strobe (C_A_Strobe) signal is used to capture the address portion of the cycle.

When a trigger event occurs (as identified via qualifiers preprogrammed into the various control registers of the watchpoint generator, Via the external tool 120), the watchpoint generator 130 may generate a plurality of watchpoint trigger signals (WPx—where x may be one of a number of such trigger signals). These watchpoint trigger signals (WPx) are delivered to the control logic module 128 and each is intended to have a unique effect on the system.

For example, a signal WP1 (see, for example, FIG. 1B) may trigger the control logic module 128. Once triggered the control logic module 128 may cause the counter value latch 122 to latch the current value of the counter 114. Further, the control logic module 128 may cause the circular buffer control module 126 to monitor the amount of data in the overlay RAM 118 and disable the counter 114 when the correct amount of data is captured.

When the circular buffer control module 126 disables the counter 114, the control logic module 128 may generate a signal and/or set a register location, which informs the user that the data is available to be uploaded. The user can then connect an external tool to access the data through the debug port 110 or communication port 104. It should be noted that the system retains the data until the user is ready to retrieve it and restart the trace process.

In the embodiment of FIG. 1C, when data acquisition is performed and the operation is not part of trace operation, the source address for each data item is captured in one bank of the overlay RAM 118 and the data for that item is captured in the another bank of the overlay RAM 118. If a given overlay RAM is fast enough, the address can be captured in one location and the data for that item in a next location.

In the range data acquisition mode, the address decoder 132 of the control logic module 128 limits the information being stored in the overlay RAM 118 (as determined by the counter 114) to an address range desired by a developer. It should be noted that for greatest efficiency it is desirable for the user to cluster the data of interest into a block. By clustering the data variables that are of interest, variables that are not of interest do not use up buffer space during the logging process. As previously mentioned, using an external tool, a developer can provide an address or a range of addresses such that the counter 114 only increments if the information latched into the overlay RAM 118 is within a preset range. When an address of a data item is not within the desired range, the data stored in the overlay RAM 118 is overwritten at a next data cycle.

In the packetized data acquisition mode, data acquisition capabilities of the MCU can be extended by capturing a sequence of data packets in response to a sequence of events. The packet is continuously updated with fresh data until a watchpoint qualifier initiates the beginning of a new packet. Each logged packet then contains the freshest data available, when the watchpoint occurs. Because the data is logged based on an event that may not continuously occur, data can generally be logged for longer periods of time. A fresh/stale bit flag may also be utilized. The external tool may determine that a particular item in the data packet was refreshed when the fresh/stale flag is set.

In general, greater efficiency can be achieved if a designer clusters the variables of interest in a small portion of the RAM, e.g., a 255-byte block when the code for the CPU 102 is developed. The data in the packet is then continuously overwritten with fresh data until another watchpoint (i.e., WP2) signals that a new packet should be started preserving the data in the current packet.

Continuing with the packetized data acquisition mode, as depicted in FIG. 1C, the overlay RAM 118 is divided into blocks, e.g., 255 bytes, and the overlay RAM address multiplexer 116C is configured such that the counter 114 provides the upper address (UA) and the lower address (LA) is provided from the CPU 102 address bus. The lower address from the CPU 102 address bus selects the individual items in the packet and the upper address selects the individual packets. In this embodiment, the watchpoint generator 130 provides a signal (WP2) to the control logic module 128, which increments the counter 114 each time a trigger address is detected. Each time the counter 114 is incremented the current packet is saved and a fresh packet is started. The signal WP1 is provided from the watchpoint generator 130 to the control logic module 128, which provides an associated signal to the circular buffer control module 126. Once the trigger is reached, the circular buffer control module 126 begins to count down until the post trigger percentage is complete. Once this is done the counter 114 is disabled to prevent buffer overrun. Further, all accesses to the 255-byte block are logged as writes. That is, all reads and writes to the desired area are captured. Because the upper address is only incremented when a trigger address is received, the block always contains the current accesses to the parameters in the block.

The control logic module 128 limits the data stored in the overlay RAM 118 to the desired block of data. The watchpoint generator 130 asserts the WP2 signal to signal the state machine 112 to increment the counter 114 so that the overlay RAM 118 can capture the next packet. In this embodiment, the fresh/stale flag allows a developer to determine what data was accessed when the data is post-processed by the external tool 120.

When the MCU includes a debug port 110, communication from the external tool 120 to CPU 102 can be via the debug port 110. As mentioned above, the external tool 120 may also communicate with the CPU 102, via the communication port 104. In certain situations, it may be advantageous for a developer to communicate via the communication port 104 in that the developer would then not be required to purchase tools (i.e., software) needed to communicate through the debug port 110. As such, when a developer utilizes tools that can communicate via CAN or another serial protocol, additional debug port tools are not required to communicate with the CPU 102.

The communication port 104 can also be shared with other applications since the upload configuration or captured data download process does not need to occur in real-time. It is contemplated that a developer, via external tool 120, can configure the MCU before the test begins with whatever bandwidth is available on the communications port 104 or debug port 110. After configuration, the MCU then runs in autonomous mode capturing the requested data. Communication through the debug port 110 may be directly to the CPU 102 bus or via the state machine 112. When the debug port 110 is directly communicating with the CPU 102, memory accesses by the debug port 110 are generally interlaced with the CPU 102 operation. It should be noted that having both communication and debug ports may be advantageous, but is not required. It should be further appreciated that this only limits the rate at which configuration information can be downloaded or which data can be uploaded from the MCU 100 to the external tool 120. When the debug port 110 communicates with the CPU 102, via the state machine 112, the debug port 110 is not required to arbitrate access to the CPU 102 bus to configure or upload data from the MCU 100. This solution generally provides a developer with maximum speed and the least intrusiveness into the CPU 102 operation.

Referring again to FIG. 1B, the circular buffer control module 126 monitors the counter 114 value to ensure that logged data does not overrun data that has already been logged, which the developer has indicated they wish to capture. The circular buffer control module 126 receives data from the developer, via the control logic module 128, which configures the module 126 with information such as the size of the overlay RAM 118 and the percent of post-trigger data that is to be acquired. The module 126 provides a counter disable signal, which stops the counter 114 from incrementing the address that is being provided to the overlay RAM 118. The counter disabled signal also indicates that the buffer of the overlay RAM 118 is full and ready to be uploaded to an external tool 120.

The counter 114, as previously discussed, provides an incrementing address for the buffer, created within a dedicated RAM or overlay RAM 118. The address provided by the counter 114 is used for both trace and data acquisition processes. When implemented, the counter value latch 122 latches the value of the counter 114 when a trigger occurs. This allows a developer, using an appropriate program, to locate a trigger point in the data acquisition trace when it is uploaded to the external tool 120. As previously stated, the debug port 110 is an interface that allows a tool, for example, the external tool 120, to access the CPU 102 and its resources (i.e., memories). The debug port 110 can be of various varieties, such as NEXUS™ or typical background debug modules, and may support different levels of intrusiveness when accessing the CPU 102 and its resources.

It should be noted that the state machine 112 can be implemented in a number of fashions, e.g., with discrete gates, programmed in a field programmable gate array (FPGA) or, in part, via a second CPU. In MCUs that have a plurality of CPUs for safety critical applications, one of the CPUs can be allocated to function as a portion of the state machine 112 saving at least some of the cost associated with implementing the state machine 112. Further, this CPU could operate from a separate program area, allowing transmission of logged data to an external tool in any communication format.

The watchpoint generator module 130 (FIGS. 1B and 1C) basically performs all of the triggering functions for the system. The watchpoint generator 130 also allows a developer, using an external tool, to define an address and/or data pattern that, upon occurrence, causes the control logic module 128 to assert an output. When the watchpoint generator 130 is used in a normal debug mode, it is used to signal a device external to the system that an event, defined as being of interest by a user, has occurred. The signal can be, for example, a hardware pin that is toggled or a serial message that is sent to the external tool 120. However, according to the present invention, the output from the watchpoint generator 130 is used ultimately to control the counter value latch 122 and the circular buffer control module 126.

It should be appreciated that capturing cycle-by-cycle CPU core information and storing it within the MCU is generally superior to techniques that only capture a branch address and the number of cycles since the last branch occurred. In systems that only send out a branch trace message, there is no way to determine if an opcode has been corrupted. For example, a "subtract" instruction may have been corrupted by bus noise and read by the CPU as an "add" instruction. This would have a vastly different effect on the system, but would not be detected by branch trace messaging. That is, using a branching technique may not allow logic analysis to differentiate between what instruction was performed. As mentioned above, these kinds of problems are very common when new microprocessors are being developed or when a new process is used to manufacture a microprocessor.

According to the present invention, a developer can determine whether various development CPUs or multiple execution units are functioning correctly. As previously discussed, many debuggers function in the single-step mode, which when a breakpoint is reached the CPU is halted and various registers are examined to determine what took place internally on the CPU buses. However, operating on breakpoints does not allow the developer to determine in real-time what took place on the internal buses of the CPU. Thus, to determine what took place ten instructions before a breakpoint using currently available debug interfaces, a developer would have to move the breakpoint back ten instructions. At that point, the developer would then execute the routine again to determine what happened on the internal buses of the CPU, after the fact.

Many currently available MCUs employ bus interface modules so that systems with external memories can be handled. The interface modules ensure the drive capability to drive external memory and port expansion modules. When these modules are left off all internal visibility to the chip is lost. With the instrumentation on chip this internal visibility is regained and without the loss of performance that often occurs when the MCU is run in expanded mode. Further, there is no need to use or develop port expansion modules to regain MCU input/output pins lost by running the MCU in expanded mode.

According to the present invention, real-time diagnostics on internal CPU operations is accomplished, which allows a developer to determine, for example, whether a gate internal to a CPU may be causing a bit of an instruction to be flipped such that the CPU, for example, grabs data immediately rather than relatively. A flipped bit may cause a CPU to actually retrieve data from the wrong address space, due to the fact that the address was calculated incorrectly. Thus, according to the present invention, instructions and data from internal CPU buses can be provided on a cycle-by-cycle basis.

Figure 2A:
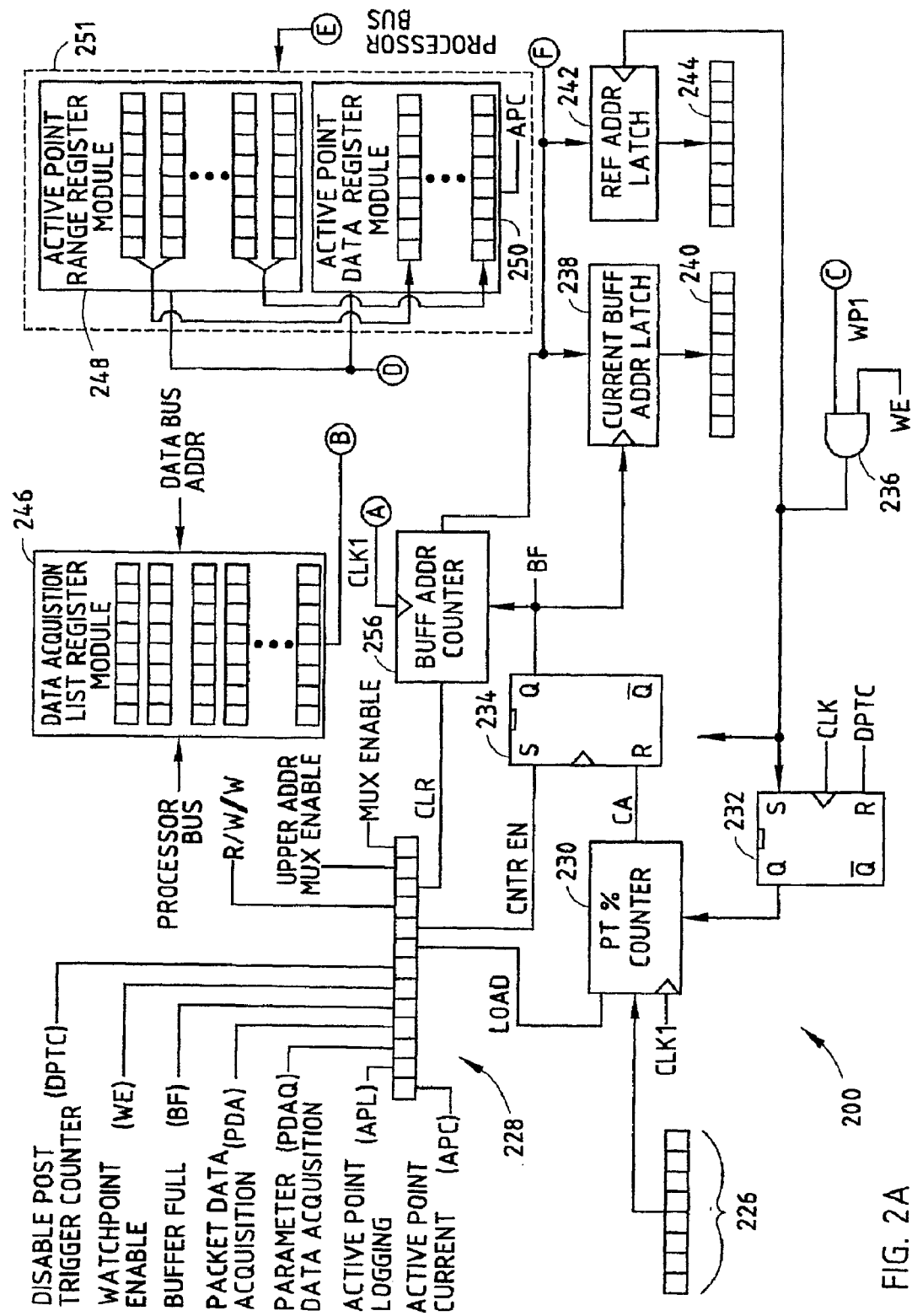
FIGS. 2A–2B is an electrical block diagram of an MCU, according to still another embodiment of the present invention.
Figure 2B:
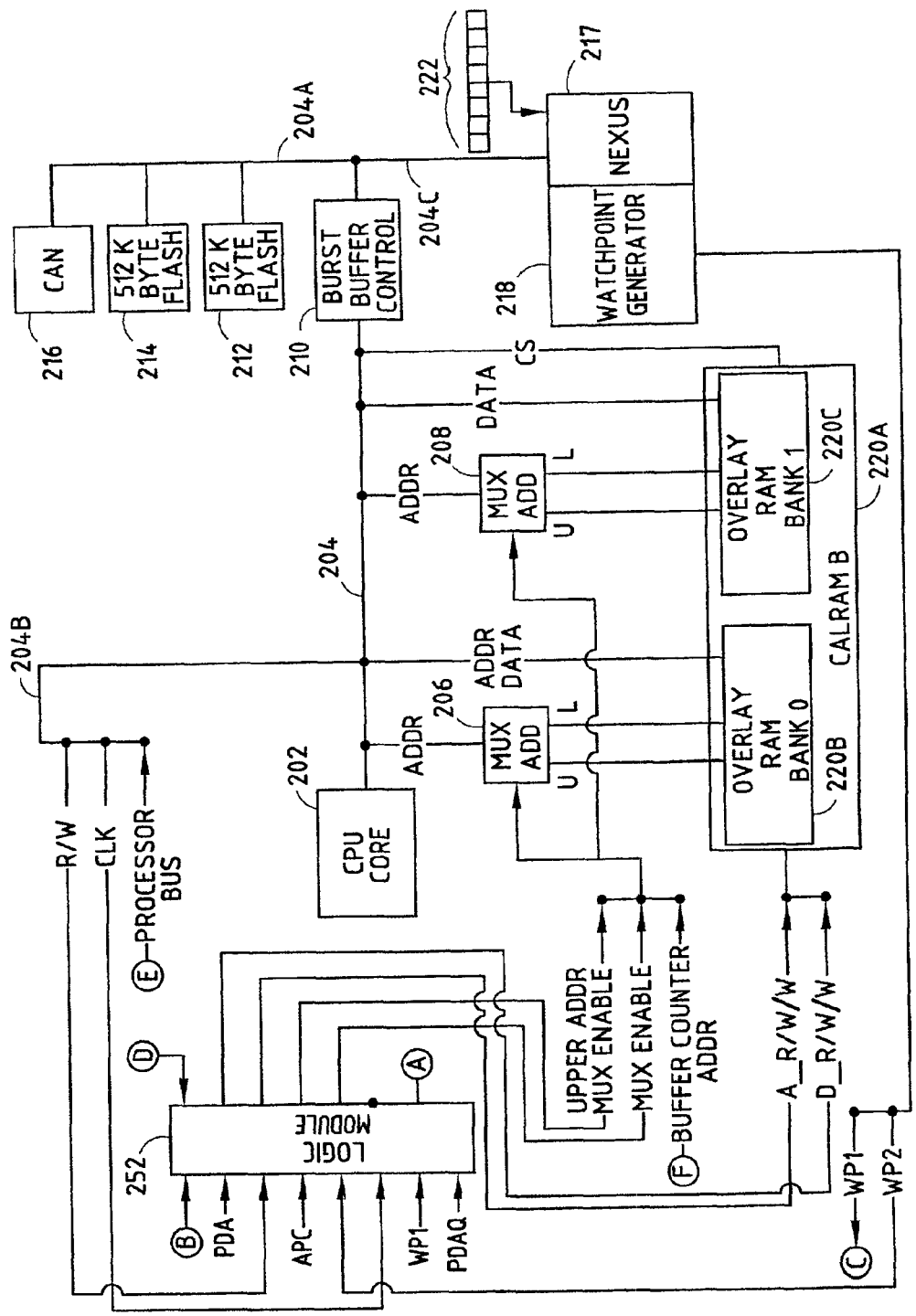

FIGS. 2A–2B depict an electrical block diagram of an exemplary MCU 200, which includes on-board instrumentation, according to an embodiment of the present invention. A CPU bus 204C is coupled to a NEXUS™ interface 217, which includes a watchpoint generator 218 that generates watchpoint signals, when an appropriate address and/or data is present on the CPU bus 204, depending upon how the watchpoint generator 218 was programmed by an external tool. In the embodiment shown in FIGS. 2A–2B, a configuration register 228 includes a plurality of registers. Depending upon how the registers are set, the MCU 200 functions in one of the six instrumentation modes (i.e., logic analyzer or one of the data acquisition modes previously discussed), calibration mode or in a normal mode.

The system control bits of the configuration register 228 include an active point current (APC) bit, an active point logging (APL) bit, a parameter data acquisition (PDAQ) bit, a packet data acquisition (PDA) bit, a buffer full (BF) bit, a watchpoint enable (WE) bit, a disable post-trigger counter (DPTC) bit, a load bit, a counter enable (CNTR EN) bit, a read/write/write (R/W/W) bit, a clear (CLR) bit, an upper address multiplexer enable (UPPER ADDR MUX ENABLE) bit and a multiplexer enable (MUX ENABLE) bit . A post-trigger percent register 226 provides a programmed count to a post-trigger percent counter 230, which decrements with each CLK1 pulse when it is enabled by flip-flop 232.

In this embodiment, the trigger signal is provided when a watchpoint (WP1) is provided by the watchpoint generator 218 contained in the state machine or provided by the NEXUS™ interface 217 (FIG. 2B). That is, providing the watchpoint enable (WE) register is set. An output of the counter 230 (FIG. 2A) is coupled to a reset input of a set-reset (SR) flip-flop 234, whose 'Q' output indicates when the circular trace buffer is full. The 'Q' output of the flip-flop 234 is coupled to an enable input of a buffer address counter 256. An output of the buffer address counter 256 also provides a trace buffer address to multiplexers 206 and 208 and is provided to a current buffer address latch 238 and a reference address latch 242. The current buffer address latch 238 is coupled to a last address buffer address register 240. The reference address latch 242 is coupled to a buffer address counter register 244, which stores the value of the buffer address counter 256, when a trigger is received. The value in the current buffer address latch 238 is latched responsive to the buffer full (BF) signal. The reference address latch 242 is latched responsive to a watchpoint (WP1) signal.

A logic module 252 (FIG. 2B) receives the packet data acquisition (PDA), parameter data acquisition (PDAQ), active point current (APC), clock (CLK), active point current (APC), read/write (R/W), watchpoint 1 (WP1) and watchpoint 2 (WP2) signals and generates an upper address multiplexer enable (U ADDR MUX ENABLE), a multiplexer enable (MUX ENABLE), an address read/write/write (A_R/W/W), a data read/write/write (D_R/W/W) and a clock 1 (CLK1) signal. One function of the logic module 252 is to transform a read/write signal from the CPU bus into an address read/write/write signal and a data read/write/write signal. The read/write/write signal allows the data on the C1PU bus to be written into the overlay RAM 220A, regardless of whether the access was a read or a write from the standpoint of the CPU 202.

When an appropriate mode is selected a watchpoint address/data configuration register 222 is programmed via an external tool, through the CPU 202, and is used to set an appropriate trigger or triggers.

A number of active point range registers and active point data registers are used to capture address information from the CPU bus 204B, when an address at a certain location or within a certain range appears on the CPU bus 204B. In response to an appropriate address on the CPU bus 204B, an active point range register module 248 (FIG. 2A) asserts an output, which is coupled to the logic module 252. Similarly, an active point data register module 250 asserts an output, which latches the address that is on the CPU bus 204B. In this manner, the active point range and data registers allow the MCU 200 to capture and store information when the CPU 202 accesses a particular address or an address within a range of addresses.

As previously described, the output of the active point range register module 248 is coupled to the logic module 252, which cause the buffer address counter 256 to increment, via the CLK1 signal, and provides an address to the overlay RAM 220A, when an appropriate address has been received. This logs the address of interest in the overlay ram 220A, making it available to the external tool at a later time. As mentioned above, the logic module 252 also receives as inputs, a packet data acquisition (PDA), a parameter data acquisition (PDAQ), a clock (CLK), an active point current (APC), a read/write (R/W), a watchpoint 1 (WP1) and watchpoint 2 (WP2) signal. As previously mentioned, the logic module 252 only provides a clock (CLK1) signal to the buffer address counter 256 clock input when an event of interest has occurred.

As previously described, the buffer address counter 256 increments when enabled. When the buffer formed within overlay RAM 220A is full, the buffer address counter 256 is disabled by the flip-flop 234 (buffer full control bit), which allows the data stored within the overlay RAM 220A to be captured and stored until such time as the buffer address counter 256 is once again enabled. The parameter list data acquisition register 246 also provides an input to the logic module 252. When an address on the CPU bus 204B is the same as the value stored in one of the registers of the parameter list data acquisition module 246, the module asserts its output, which in turn causes the buffer address counter 256 to be incremented. This causes the overlay RAM 220A to capture the information of interest from the CPU bus 204B. In this manner the resulting data is composed only of the parameters that were specified in the list.

Figure 3A:
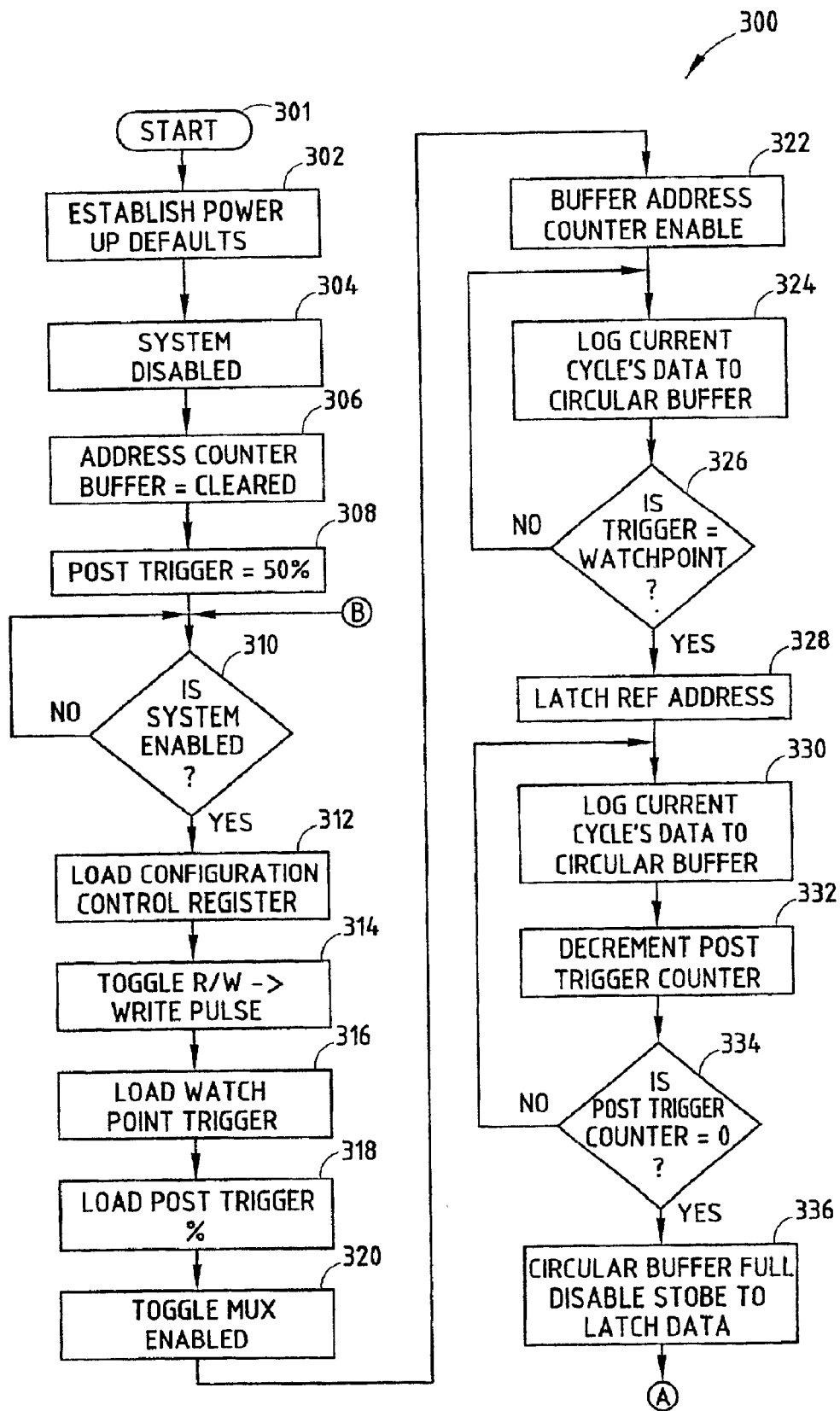
FIGS. 3A–3B is a behavioral model of an MCU implementing a limited trace mode, according to one embodiment of the present invention.
Figure 3B:
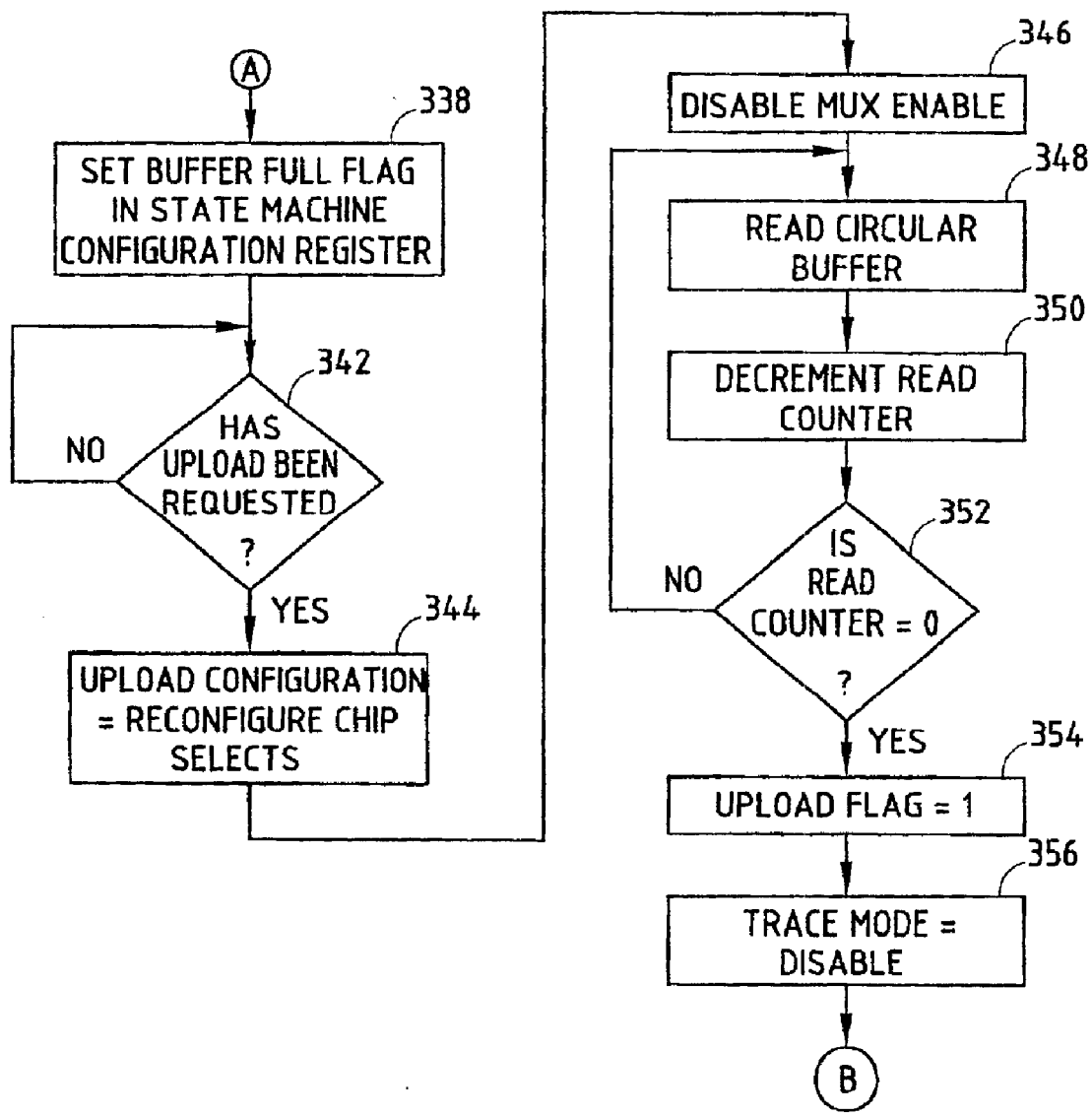

FIGS. 3A–3B depict a flowchart of an exemplary behavioral model 300 for implementing the limited trace mode, according to the present invention. For illustration, the discussion of FIGS. 3A–3B is directed to the hardware embodiment shown in FIGS. 2A–2B. The behavioral model 300 may be implemented in software, hardware or firmware. As mentioned above, a program executing on an external tool reconvolves addresses for the limited trace mode with knowledge of the various routines that are executing on a given MCU. The model 300 is initiated at step 301 at which point control transfers to step 302. In step 302, various power-up defaults are established for instrumentation of the MCU 200. Next, in step 304, the instrumentation is disabled (default value). Then, in step 306, the buffer address counter 256 is cleared.

Next, in step 308, a value of the post trigger buffer register 226 is set to a default value, e.g., fifty percent. It should be appreciated that the post trigger buffer register 226 can initially be set to any value from 0 to 100 percent, depending on what is required by the developer. Next, in decision step 310, when the system is enabled (e.g., by an external tool providing a start-up message, through, for example, a serial port, that indicates to the ECU that the instrumentation function should be activated), control transfers from step 310 to step 312. Otherwise, control loops on step 310.

In step 312, the CPU 202 of the MCU 200 loads the configuration control register 228 with the values received from the external tool. Next, control transfers to step 314 where the logic module 252 of the state machine is configured to turn a read or write pulse from the CPU 202 to a device into a write pulse to the overlay RAM 220A. Then, in step 316, the watchpoint trigger is loaded into the register 222, which basically dictates what the state machine will trigger on. Next, in step 318, the post trigger percent value is loaded into the post trigger percent counter 230. It should be appreciated that the value loaded is dictated by the post trigger percent register 226, which is programmed by an external tool via, for example, a serial port.

Then, in the next step 320 the multiplexers 206 and 208 are enabled so that information can be stored within instrumentation memory 220A, as appropriate. Next, in step 322, the buffer address counter 256 is enabled, which initiates the data capture process. As previously mentioned, the buffer address counter 256 is utilized to provide a unique address to the overlay RAM 220A for each CPU clock cycle. An external tool can then upload this stored information at a later time. Next, in step 324, the data and instruction information for one cycle is captured in the circular buffer formed in the instrumentation RAM 220A. Then, in decision step 326, the model 300 determines whether the watchpoint is at a trigger point. If not, control transfers from step 326 to step 324, where the circular buffer continues to be filled on a cycle-by-cycle basis.

If a watchpoint has been reached in step 326, control transfers to step 328 where the reference address of the buffer address counter 256 is latched by the reference address latch 242 into the register 244. Next, in step 330, the circular buffer logs another cycle of data. Then, in step 332, the post-trigger counter 230 is decremented. Next, in decision step 334, the model determines whether the post-trigger counter 230 is equal to zero. If so, control transfers to step 336. Otherwise, control returns to step 330 to capture additional cycles of data from the CPU 202.

In step 336, when the circular buffer is full, the buffer address counter 256 is disabled and no additional data is latched into the memory 220A. Next, in step 338, the buffer full (BF) flag is set in the configuration register 228. It should be appreciated that the state machine will not log additional data into the instrumentation RAM 220A until an external tool clears the buffer full (BF) bit or retrieves the information from the RAM and then clears the buffer full (BF) bit of the configuration register 228. When connected to an external tool, the external tool queries the MCU 200 to determine whether any data has been captured and, if so, proceeds to upload that information from the instrumentation RAM 220A of the MCU 200. Next, in decision step 342, the model 300 determines whether a request has been made to upload the information. If so, control transfers from step 342 to step 344. Otherwise, control loops on step 342. When an upload command is received in step 342, the chip select (CS) lines of the instrumentation RAMs 220A are reconfigured in step 344. Next, in step 346, the multiplexers 206 and 208 are disabled to allow data to be read out of the instrumentation RAM. Then, in step 348, a location of the circular buffer is read. Next, in step 350, a read counter for the circular buffer is decremented. Then, in decision step 352, the model determines whether the read counter is equal to zero. If so, control transfers to step 354. Otherwise, control transfers to step 348 where the model 300 continues to read additional locations from the circular buffer, one location at a time. Once the upload flag is set the model transfers to step 356, where the external tool disables the limited trace mode by clearing the watchpoint enable bit of the configuration register 228. Then, control returns to step 310 where the model 300 terminates if the system is not enabled.

Accordingly, a behavioral model has been described that can store information from internal CPU buses, e.g., instruction and application data, which can later be used by an external tool (using a reference address) to reconvolve the addresses for the instructions and application data. It should be appreciated that the full trace mode, which captures all information on CPU address and data bus, is similar to the limited trace mode. However, since the full trace mode captures all information, there is no need to reconvolve the addresses for instructions and data in full trace mode.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. An electronic control unit (ECU), comprising:
 a central processing unit (CPU) coupled to a port which couples the CPU to an external tool, the CPU executing a control algorithm which controls a subsystem coupled to the ECU;
 a non-volatile memory bank coupled to the CPU, the non-volatile memory bank storing a plurality of calibration tables and a code set;
 a volatile memory coupled to the CPU; and
 a state machine in communication with the CPU, wherein the state machine functions to selectively capture information available on an internal bus of the CPU on a cycle-by-cycle basis and store the captured information in the volatile memory, and wherein the state machine is implemented by one of another CPU, discrete gates, a field programmable gate array (FPGA) and a digital signal processor (DSP).

2. The ECU of claim 1, wherein the captured information includes one of a full trace and limited trace of information on at least one of an address and data bus of the CPU.

3. The ECU of claim 2, wherein the CPU has separate instruction and data buses.

4. The ECU of claim 2, wherein the CPU uses the same bus for both instructions and data.

5. The ECU of claim 1, wherein the state machine performs triggering, data acquisition and circular buffer control of a trace buffer located within the volatile memory.

6. The ECU of claim 1, wherein the state machine includes a counter.

7. The ECU of claim 1, further including:
 an overlay memory that the state machine configures as a trace buffer which captures valid data on the data bus, wherein the overlay memory receives it address from an address counter that is incremented with each clock cycle that contains one of instruction information and data information.

8. The ECU of claim 7, wherein the trace buffer only captures operational codes and associated data.

9. The ECU of claim 7, wherein the overlay memory is divided into a first memory bank and a second memory bank with the address counter providing address information for both of the banks, and wherein the first memory bank stores an address for each cycle and the second memory bank stores one of an associated operational code and application data for each cycle.

10. The ECU of claim 7, wherein the overlay memory is implemented as a dedicated RAM device.

11. The ECU of claim 7, wherein the overlay memory is implemented as a non-volatile device.

12. The ECU of claim 1, further including:
 a debug port, wherein the debug port is coupled to the CPU.

13. The ECU of claim 1, wherein the port is one of a debug interface and an existing serial communication port.

14. The ECU of claim 1, wherein the CPU, non-volatile memory bank, volatile memory and state machine are implemented within a microcontroller unit (MCU).

15. The ECU of claim 1, further including:
 a watchpoint generator for providing a triggering signal to the state machine.

16. The ECU of claim 1, further including:
 a watchpoint generator for providing triggering signals to the state machine.

17. The ECU of claim 1, wherein the captured information is confined to a specific list by the state machine.

18. The ECU of claim 1, wherein the captured information is confined to an address range specified by the state machine.

19. The ECU of claim 18, wherein the captured information is confined to a series of packets stored in the volatile memory.

20. The ECU of claim 1, wherein the volatile memory is protected from data loss during normal operating conditions.

21. The ECU of claim 1, wherein only operational code and data of a CPU cycle are saved in the volatile memory and the state machine saves an address of a CPU access in a register when a trigger occurs.

22. The ECU of claim 1, wherein the state machine captures an address of a CPU access in a specified address range.

23. The ECU of claim 22, wherein the state machine stores the captured address in a specific register.

24. The ECU of claim 22, wherein the state machine stores the captured address in the volatile memory.

25. The ECU of claim 22, wherein the state machine stores the captured addresses in the volatile memory as a series of packets.

26. An electronic control unit (ECU), comprising:
 a central processing unit (CPU) coupled to a port which couples the CPU to an external tool, the CPU executing a control algorithm which controls a subsystem coupled to the ECU;
 a non-volatile memory bank coupled to the CPU, the non-volatile memory bank storing a plurality of calibration tables and a code set;
 a volatile memory coupled to the CPU;
 an overlay memory coupled to the CPU; and
 a state machine in communication with the CPU, wherein the state machine functions to selectively capture information available on an internal bus of the CPU on a cycle-by-cycle basis and store the captured information in the overlay memory, and wherein the state machine configures the overlay memory as a trace buffer which captures valid data on the data bus, where the overlay memory receives it address from an address counter that is incremented with each clock cycle that contains one of instruction information and data information.

27. The ECU of claim 26, wherein the captured information includes one of a full trace and a limited trace of information on at least one of an address and data bus of the CPU.

28. The ECU of claim 26, wherein the CPU has separate instruction and data buses.

29. The ECU of claim 26, wherein the CPU uses the same bus for both instructions and data.

30. The ECU of claim 26, wherein the state machine performs triggering, data acquisition and circular buffer control of a trace buffer located within the volatile memory.

31. The ECU of claim 26, wherein the state machine includes a counter.

32. The ECU of claim 26, wherein the trace buffer only captures operational codes and associated data.

33. The ECU of claim 26, wherein the overlay memory is divided into a first memory bank and a second memory bank with the address counter providing address information for both of the banks, and wherein the first memory bank stores an address for each cycle and the second memory bank stores one of an associated operational code and data for each cycle.

34. The ECU of claim 26, further including:
a debug port, wherein the debug port is coupled to the CPU.

35. The ECU of claim 26, wherein the port is a debug interface.

36. The ECU of claim 26, wherein the state machine is implemented by one of another CPU, discrete gates, a field programmable gate array (FPGA) and a digital signal processor (DSP).

37. The ECU of claim 26, wherein the CPU, non-volatile memory bank, volatile memory, overlay memory and state machine are implemented within a microcontroller unit (MCU).

38. An automotive microcontroller unit (MCU), comprising:
a central processing unit (CPU) coupled to a port which couples the CPU to an external tool, the CPU executing a control algorithm which controls an automotive subsystem coupled to the MCU;
a non-volatile memory bank coupled to the CPU, the non-volatile memory bank storing a plurality of calibration tables and a code set;
a volatile memory coupled to the CPU;
a state machine in communication with the CPU, wherein the state machine functions to selectively capture information available on an internal bus of the CPU on a cycle-by-cycle basis and store the captured information in the volatile memory, and wherein the state machine is implemented by one of another CPU, discrete gates, a field programmable gate array (FPGA) and a digital signal processor (DSP); and
a debug port coupled to the CPU.

* * * * *